US008015397B2

United States Patent
Sevak

(10) Patent No.: US 8,015,397 B2
(45) Date of Patent: Sep. 6, 2011

(54) SYSTEM AND METHOD FOR DETERMINING AN OPTIMUM NUMBER OF REMOTELY-BOOTED INFORMATION HANDLING SYSTEMS

(75) Inventor: Ram Sevak, Uttar Pradesh (IN)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 12/251,630

(22) Filed: Oct. 15, 2008

(65) Prior Publication Data

US 2010/0095105 A1 Apr. 15, 2010

(51) Int. Cl.
*G06F 15/177* (2006.01)
(52) U.S. Cl. ............... 713/2; 709/219; 709/222; 714/25
(58) Field of Classification Search ...... 713/2; 709/219, 709/222; 714/25
See application file for complete search history.

(56) References Cited

U.S. PATENT DOCUMENTS

| 7,251,725 | B2 * | 7/2007 | Loison et al. ............... 713/1 |
| 7,415,519 | B2 * | 8/2008 | Abbondanzio et al. ....... 709/226 |
| 2003/0005096 | A1 * | 1/2003 | Paul et al. ............... 709/222 |
| 2003/0009657 | A1 * | 1/2003 | French et al. ............... 713/2 |
| 2005/0283597 | A1 * | 12/2005 | Holzmann ............... 713/2 |

OTHER PUBLICATIONS

Capacity Planning Guidelines, iSCSI Boot Using, winBoot/i™ & netBoot/i™, em Boot Inc., 9 pages.

* cited by examiner

*Primary Examiner* — Thuan N Du
(74) *Attorney, Agent, or Firm* — Baker Botts L.L.P.

(57) ABSTRACT

Systems and methods for reducing problems and disadvantages associate with remotely booting multiple information handling systems are disclosed. A method may include obtaining system-specific parameters regarding a system including a plurality of remotely-booted clients, the system-specific parameters including a average client boot time threshold. The method may also include generating a plurality of client boot threads based on at least one or more of the system-specific parameters. The method may additionally include measuring an actual average client boot time of the plurality of client boot threads. The method may further include determining a number of remotely-booted clients for substantially simultaneous remote booting based on at least the actual average client boot time and the average client boot time threshold.

20 Claims, 2 Drawing Sheets

SYSTEM AND METHOD FOR DETERMINING AN OPTIMUM NUMBER OF REMOTELY-BOOTED INFORMATION HANDLING SYSTEMS

TECHNICAL FIELD

The present disclosure relates in general to remotely-booted information handling systems, and more particularly determining and optimum number of boot clients per iSCSI boot management server.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures by which information handling systems boot their respective operating systems remotely from storage resources via a network. Often, these architectures are employed for numerous reasons, including without limitation: (1) increased concern with the security of data-at-rest in information handling systems, particularly in portable computing devices (e.g., notebooks, laptops, and handhelds); and (2) simplified operating system management.

In a typical remote boot scenario, a remotely-booted information handling system (which may also be referred to as a "client") may initially be powered on. After the client powers up, it may issue a broadcast over a network (e.g., via an integrated network interface card) seeking boot instructions. Upon receiving the broadcast, a configuration server (e.g., a dynamic host configuration protocol, or "DHCP," server) may reply to the client with an address (e.g., an Internet Protocol address) for a boot management server. The client may then communicate with the boot management server to request parameters required for the client to boot. For example, in Internet Small Computer System Interface (iSCSI) protocol implementations, the boot client may request iSCSI parameters needed to communicate to an iSCSI storage resource storing a boot image (e.g., target portal, target iSCSI qualified name, initiator iSCSI qualified name, challenge-handshake authentication protocol credentials, etc.).

The boot management server may respond to the client with the requested parameters, and the client may store such parameters. The client may also use the parameters to communicate with a remote storage resource storing a boot image (e.g., operating system) for the client. Accordingly, the client may remotely boot the image from the remote storage resource.

However, in scenarios in which multiple information handling systems are booted using common resources (e.g., common storage resources and/or common boot management servers) such common resources may not have sufficient capacity to allow the information handling systems to boot within a preferred time. In implementations where the information handling systems include "mission-critical" or priority computing devices, such delayed booting may be particularly undesirable.

SUMMARY

In accordance with the teachings of the present disclosure, the disadvantages and problems associated remotely booting multiple information handling systems have been substantially reduced or eliminated.

In accordance with an embodiment of the present disclosure, a method for determining a number of clients for substantially simultaneous remote booting is provided. The method may include obtaining system-specific parameters regarding a system including a plurality of remotely-booted clients, the system-specific parameters including a average client boot time threshold. The method may also include generating a plurality of client boot threads based on at least one or more of the system-specific parameters. The method may additionally include measuring an actual average client boot time of the plurality of client boot threads. The method may further include determining a number of remotely-booted clients for substantially simultaneous remote booting based on at least the actual average client boot time and the average client boot time threshold.

In accordance with another embodiment of the present disclosure, an information handling system may include a processor, a memory communicatively coupled to the processor, and a test module communicatively coupled to the processor. The test module may be configured to (a) obtain system-specific parameters regarding a system including a plurality of remotely-booted clients, the system-specific parameters including a average client boot time threshold; (b) generate a plurality of client boot threads based on at least one or more of the system-specific parameters; (c) measure an actual average client boot time of the plurality of client boot threads; and (d) determine a number of remotely-booted clients for substantially simultaneous remote booting based on at least the actual average client boot time and the average client boot time threshold.

In accordance with a further embodiment of the present disclosure, a system may include a plurality of remotely-booted clients, a network storage system communicatively coupled to the plurality of remotely-booted clients, a boot management server communicatively coupled to the plurality of remotely-booted clients, and a test module communicatively coupled to the plurality of remotely booted clients. The network storage system may include at least one boot image associated with the plurality of remotely-booted clients. The boot management server may be configured to communicate network storage system parameters to the plurality of remotely-booted clients, the network storage system parameters including information allowing the plurality of remotely-booted clients to remotely boot from the network storage system. The test module may be configured to (a) obtain system-specific parameters regarding at least one of the plurality of remotely-booted clients, the network storage system, and the boot management server, the system-specific parameters including a average client boot time threshold; (b) generate a plurality of client boot threads based on at least one or more of the system-specific parameters; (c) measure an actual average client boot time of the plurality of client boot threads; and (d) determine a number of remotely-booted clients for substantially simultaneous remote booting based on at least the actual average client boot time and the average client boot time threshold.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
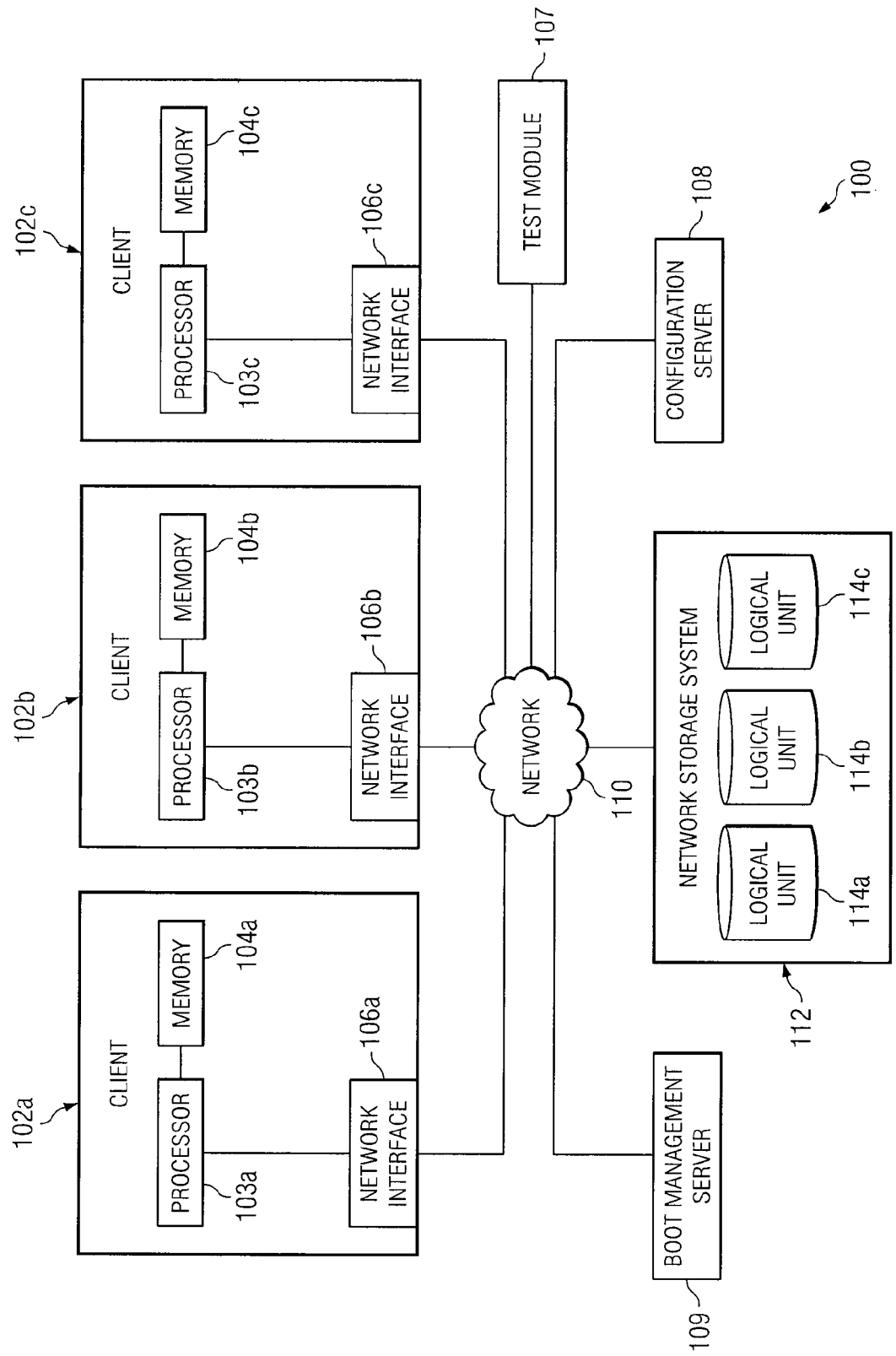
FIG. 1 illustrates a block diagram of an example system for determining an optimum number of substantially simultaneously remotely-booted information handling systems, in accordance with certain embodiments of the present disclosure.
Figure 2:
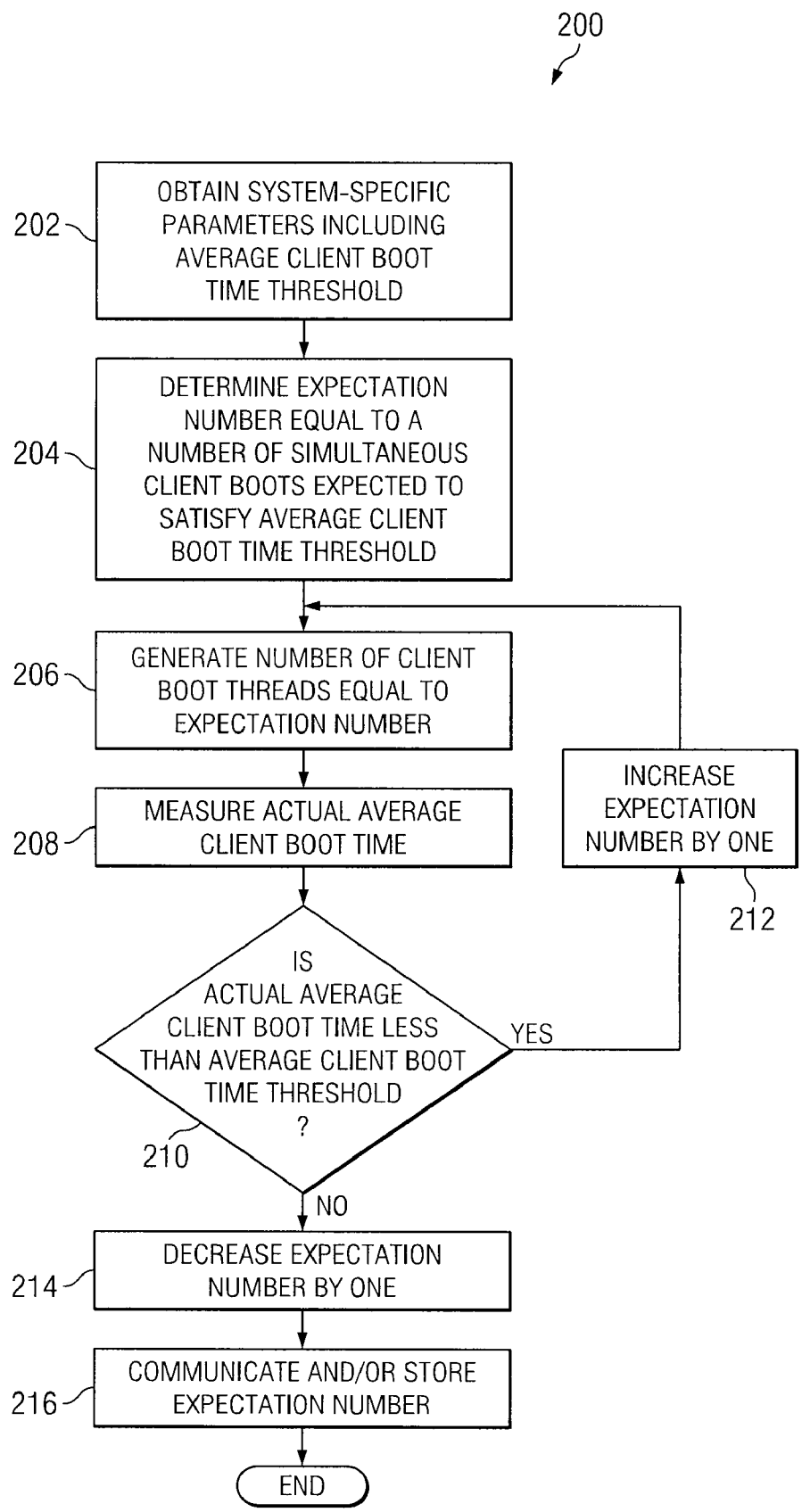
FIG. 2 illustrates a flow chart of an example method for determining an optimum number of substantially simultaneously remotely-booted information handling systems, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example system 100 for determining an optimum number of substantially simultaneously remotely-booted clients 102, according to embodiments of the present disclosure. As depicted in FIG. 1, system 100 may comprise one or more clients 102, a test module 107, a configuration server 108, a boot management server 109, a network 110, and a network storage system 112.

Each client 102 may comprise an information handling system and may generally be configured to read data from and/or write data to one or more logical units 114 disposed in network storage system 112. In the same or alternative embodiments, each client 102 may be operable to receive data from and/or communicate data to one or more other clients 102 via network 110. In certain embodiments, one or more of clients 102 may be a server. Although system 100 is depicted as having three clients 102, it is understood that system 100 may include any number of clients 102.

As depicted in FIG. 1, each client 102 may comprise a processor 103, a memory 104 communicatively coupled to processor 103, and a network interface 106 communicatively coupled to processor 103. For purposes of clarity, each client 102 may generally be referred to as "client 102" in the present disclosure.

Each processor 103 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in its associated memory 104 and/or another component of its associated client 102.

Each memory 104 may be communicatively coupled to its associated processor 103 and may comprise any system, device, or apparatus configured to retain program instructions or data for a period of time (e.g., computer-readable media). Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated client 102 is turned off.

Each network interface 106 may be any suitable system, apparatus, or device operable to serve as an interface between its associated client 102 and network 110. Each network interface 106 may enable its respective client 102 to communicate over network 110 using any suitable transmission protocol and/or standard, including without limitation all transmission protocols and/or standards enumerated below with respect to the discussion of network 110. In certain embodiments, network interface 106 may be configured with hardware, software, and/or firmware to allow its associated host 102 to remotely boot from a logical unit 114. For example, network interface 106 may be enabled to boot client 102 using a Preboot Execution Environment (PXE) or similar boot environment.

As shown in FIG. 1, system 100 may include a test module 107. Test module 107 may include any system, device or apparatus configured to obtain system-specific parameters regarding system 100 and determine an optimum number of substantially simultaneously remotely-booted information handling systems, for example as described in greater detail with respect to FIG. 2 below. Test module 107 may be implemented in hardware, software, firmware, or any combination thereof. In some embodiments, test module 107 may include or may be an integral part of an information handling system. In the same or alternative embodiments, test module 107 may be an integral part of a client 102.

Configuration server 108 may comprise an information handling system and may generally be configured to store and/or communicate parameters to clients 102 in order to allow clients to communicate with boot management server 109. For example, during boot of a client 102, client 102 may communicate (e.g., broadcast via PXE) to configuration server 108 a request for parameters required to communicate with boot management server 109. Such parameters may include a network address (e.g., Internet Protocol address) to be assigned to client 102, a network address or other identifier for boot management server 109, and/or any other suitable parameters. In response, configuration server 108 may communicate the requested parameters to client 102. In some embodiments, configuration server 108 may include a dynamic host configuration protocol (DHCP) server. In some embodiments, configuration server may include components similar to that of clients 102 (e.g., processor, memory, and/or network interface).

Boot management server 109 may comprise an information handling system and may generally be configured to store and communicate parameters to clients 102 to allow clients 102 to remotely boot from a logical unit 114. For example, in embodiments in which clients 102 and logical units 114 are configured to communicate via Internet Small Computer System Interface (iSCSI) protocol, boot management server 109 may store iSCSI parameters (e.g., target portal, target iSCSI qualified name, initiator iSCSI qualified name, challenge-handshake authentication protocol credentials, etc.) required for communication between a client 102 and a logical unit 114 storing a boot image (e.g., operating system) associated with the particular client 102. When queried by a client 102 for the relevant parameters, boot management server 109 may communicate such parameters to the requesting client 102. In some embodiments, configuration server may include components similar to that of clients 102 (e.g., processor, memory, and/or network interface).

Although configuration server 108 and boot management server 109 are depicted as separate components in FIG. 1, in some embodiments configuration server 108 and boot management server 109 may be implemented as integral components of the same information handling system.

Network 110 may be a network and/or fabric configured to couple clients 102 to network storage system 112. In certain embodiments, network 110 may allow clients 102 to connect to logical units 114 disposed in network storage system 112 such that the logical units 114 appear to clients 102 as locally attached storage resources. In the same or alternative embodiments, network 110 may include a communication infrastructure, which provides physical connections, and a management layer, which organizes the physical connections, logical units 114 of network storage system 112, and clients 102. In the same or alternative embodiments, network 110 may allow block I/O services and/or file access services to logical units 114 disposed in network storage system 112.

Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Network storage system 112 may comprise one or more logical units 114, and may be communicatively coupled to clients 102 and/or network 110, in order to facilitate communication of data between clients 102 and logical units 114. Logical units 114 may each be made up of one or more hard disk drives, magnetic tape libraries, optical disk drives, magneto-optical disk drives, compact disk drives, compact disk arrays, disk array controllers, and/or any other type of computer-readable media. In certain embodiments, one or more logical units 114 may comprise an operating system image and may serve as a boot logical unit to an associated client 102 (e.g., logical unit 114a may serve as a boot logical unit for client 102a). Although the embodiment shown in FIG. 1 depicts system 100 having three logical units 114, network storage system 112 may have any number of logical units 114.

In some embodiments, network storage system 112 may include one or more storage enclosures configured to hold and power one or more physical storage resources comprising logical units 114. In such embodiments, such storage enclosures may be communicatively coupled to one or more of clients 102 and/or network 110, in order to facilitate communication of data between clients 102 and logical units 114.

In operation, a client 102, using boot parameters communicated from boot management server 109, may boot remotely from a corresponding boot logical unit 114.

FIG. 2 illustrates a flow chart of an example method 200 for determining an optimum number of substantially simultaneously remotely-booted information handling systems, in accordance with certain embodiments of the present disclosure.

According to one embodiment, method 200 preferably begins at step 202. As noted above, teachings of the present disclosure may be implemented in a variety of configurations of system 100. As such, the preferred initialization point for method 200 and the order of the steps 202-216 comprising method 200 may depend on the implementation chosen.

At step 202, test module 107 and/or another suitable component of system 100 may obtain system-specific parameters regarding system 100, including a average client boot time threshold. System-specific parameters may include, without limitation: (a) a peak load of system 100 (e.g., in worst-case scenario, the maximum number of clients that will require booting, such as when a significant portion of clients 102 must be restarted, for example); (b) the number of clients 102 typically rebooted on average; (c) the number of clients 102 that may terminate or stall during boot without impacting availability or performance of system 100; (d) the actual or estimated load on network storage system 112 and/or logical units 114; (e) average size of boot images on logical units 114); (f) the level of redundancy of boot management server 109; (g) disaster recovery schemes for system 100; and (h) an average client boot time threshold. Such system-specific parameters may be obtained in any suitable manner. In some embodiments, an administrator and/or manager of system 100 may determine the system-specific parameters based on observation and/or personal preference and communicate the parameters to test module 107 and/or another person responsible for inputting the parameters to test module 107. In the same or alternative embodiments, one or more system-specific parameters may be monitored and/or automatically determined by test module 107. In the same or alternative embodiments, the average client boot time threshold may comprise and/or correspond to a desired maximum average boot time (e.g., a desired maximum average boot time selected by a user and/or network administrator, and/or a desired maximum average boot time determined automatically by one or more components of system 100).

At step 204, test module 107 and/or another suitable component of system 100 may determine an expectation number based at least on one or more of the system-specific parameters such that the expectation number is equal to a number of simultaneous client boots expected to satisfy the average client boot time threshold. In some embodiments, the determined expectation number may correspond to an average number of simultaneous client boots expected to satisfy the average client boot time threshold. In other embodiments, the determined expectation number may correspond to a maximum number of simultaneous client boots expected to satisfy the average client boot time threshold In some embodiments, the expectation number may be determined by a person based on analysis of the system-specific parameters and input to test module 107.

At step 206, test module 107 and/or another suitable component of system 100 may generate, substantially simultaneously, a number of client boot threads equal to the expectation number. The generation of substantially simultaneous boot threads may be accomplished in any suitable manner. For example, test module 107 may communicate instructions to other clients 102 such that a number of clients 102 equal to the expectation number are substantially simultaneously booted. In addition to or alternatively, test module 107 may instantiate, substantially simultaneously, a number of virtual machines on one or more clients 102, the number of virtual machines equal to the expectation number. Each of the instantiated virtual machines may then attempt to boot from network storage system 112 in accordance with the systems and methods set forth herein. In alternative embodiments, one or more client boot threads may be generated manually by a person.

As used herein, a "virtual machine" may refer to a virtual or "guest" operating system. A single physical client 102 may include multiple virtual machines in which each virtual machine appears as a logical machine on a computer network. The presence of one or more virtual machines on a single physical client provides a separation of the hardware and software of a networked computer system. In certain instances, each virtual machine could be dedicated to the task of handling a single function. For example, in a particular embodiment, one virtual machine could be a mail server, while another virtual machine present on the same physical host could be a file server. In addition, any number of programs, e.g., operating systems and/or applications, may run on each virtual machine.

At step 208, test module 107 and/or another suitable component of system 100 may measure the actual average client boot time for each of the generated client boot threads.

At step 210, test module 107 and/or another suitable component of system 100 may determine whether the actual average client boot time is less than the average client boot time threshold. If the actual average client boot time is less than the average client boot time threshold, method 200 may proceed to step 212. Otherwise, if the average client boot time threshold is not less than the actual average client boot time, method 200 may proceed to step 214.

At step 212, in response to a determination that the actual average client boot time is less than the average client boot time threshold, the expectation number may be increased by one, and method 200 may proceed again to step 206.

At step 214, in response to a determination that the actual average client boot time is not less than the average client boot time threshold, the expectation number may be decreased by one.

After step 214, the expectation number may be approximately equal to the maximum number of clients 102 that may boot substantially simultaneously while satisfying the average client boot time threshold. Accordingly, at step 216, the expectation number may be communicated to and/or stored in a storage medium and/or memory for later access (e.g., a storage medium and/or memory of boot management server 109) for later use. After completion of step 214, method 200 may end. Using the stored expectation number, the boot management server 109 may limit the number of clients 102 that may boot simultaneously, so as to ensure that clients 102 have an average boot time less than the average client boot time threshold.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software embodied in computer-readable media.

Using the methods and systems disclosed herein, problems associated with conventional approaches to simultaneous remote booting of clients may be improved, reduced, or eliminated. For example, the methods and systems disclosed herein provide a method of determining an optimum number of clients that may be booted substantially simultaneously while satisfying desired parameters regarding the average boot time of the clients.

In some embodiments, the methods and systems described above may allow an information handling system and/or equipment supplier to test a customer's system environment and make recommendations as to how the customer may improve network performance. For example, a supplier may configure a client 102 and instantiate a number of virtual machines to boot (e.g., over the Internet via iSCSI communication) using the customer's configuration server 108, boot management server 109 and network storage system 112. Based on the performance of the instantiated virtual machines and system-specific parameters of the customer's overall system, the supplier may recommend purchases or provide advice to the customer with regard to improving system performance.

Although the present disclosure has been described in detail, it should be understood that various changes, substitutions, and alterations can be made hereto without departing from the spirit and the scope of the disclosure as defined by the appended claims.

What is claimed is:

1. A method for determining a number of clients for substantially simultaneous remote booting, comprising:
    obtaining system-specific parameters regarding a system including a plurality of remotely-booted clients, the system-specific parameters including an average client boot time threshold;
    generating a plurality of client boot threads based on at least one or more of the system-specific parameters;
    measuring an actual average client boot time of the plurality of client boot threads; and
    determining a number of remotely-booted clients for substantially simultaneous remote booting based on at least the actual average client boot time and the average client boot time threshold.

2. A method according to claim 1, the system-specific parameters including at least one of: a peak load of the system, an average number of remotely-booted clients typically rebooted, a number of remotely-booted clients that may terminate during boot without impacting availability or performance of system, an actual load on a network storage system communicatively coupled to the plurality of remotely-booted clients, a size of boot images stored on logical units communicatively coupled to the plurality of remotely-booted clients, and a level of redundancy of a boot management server communicatively coupled to the plurality of remotely-booted clients.

3. A method according to claim 1, wherein the plurality of remotely-booted clients are booted from at least one boot image stored on a network storage system communicatively coupled to the remotely-booted clients via Internet Small Computer System Interface (iSCSI).

4. A method according to claim 1, wherein generating a plurality of client boot threads includes instantiating a plurality of virtual machines, each virtual machine generating a client boot thread.

5. A method according to claim 1, wherein the average client boot time threshold comprises a desired maximum average client boot time.

6. A method according to claim 1, wherein the determined number of remotely-booted clients is approximately equal to a maximum number of remotely-booted clients that may be substantially simultaneously booted with an average boot time less than the average client boot time threshold.

7. A method according to claim 1, wherein the determined number of remotely-booted clients is approximately equal to an average number of remotely-booted clients that may be substantially simultaneously booted with an average boot time less than the average client boot time threshold.

8. An information handling system comprising:
    a processor;
    a memory communicatively coupled to the processor; and
    a test module communicatively coupled to the processor and configured to:
        obtain system-specific parameters regarding a system including a plurality of remotely-booted clients, the system-specific parameters including an average client boot time threshold;
        generate a plurality of client boot threads based on at least one or more of the system-specific parameters;
        measure an actual average client boot time of the plurality of client boot threads; and
        determine a number of remotely-booted clients for substantially simultaneous remote booting based on at least the actual average client boot time and the average client boot time threshold.

9. An information handling system according to claim 8, the system-specific parameters including at least one of: a peak load of the system, an average number of remotely-booted clients typically rebooted, a number of remotely-booted clients that may terminate during boot without impacting availability or performance of system, an actual load on a network storage system communicatively coupled to the plurality of remotely-booted clients, a size of boot images stored on logical units communicatively coupled to the plurality of remotely-booted clients, and a level of redundancy of a boot management server communicatively coupled to the plurality of remotely-booted clients.

10. An information handling system according to claim 8, wherein the plurality of remotely-booted clients are booted from at least one boot image stored on a network storage system communicatively coupled to the remotely-booted clients via Internet Small Computer System Interface (iSCSI).

11. An information handling system according to claim 8, the test module further operable to instantiate a plurality of virtual machines, each virtual machine configured to generate a client boot thread.

12. An information handling system according to claim 8, wherein the average client boot time threshold comprises a desired maximum average client boot time.

13. An information handling system according to claim 8, wherein the determined number of remotely-booted clients is approximately equal to a maximum number of remotely-booted clients that may be substantially simultaneously booted with an average boot time less than the average client boot time threshold.

14. An information handling system according to claim 8, wherein the determined number of remotely-booted clients is approximately equal to an average number of remotely-booted clients that may be substantially simultaneously booted with an average boot time less than the average client boot time threshold.

15. A system comprising:
    a plurality of remotely-booted clients;
    a network storage system communicatively coupled to the plurality of remotely-booted clients, the network storage system including at least one boot image associated with the plurality of remotely-booted clients;
    a boot management server communicatively coupled to the plurality of remotely-booted clients, the boot management server configured to communicate network storage system parameters to the plurality of remotely-booted clients, the network storage system parameters including information allowing the plurality of remotely-booted clients to remotely boot from the network storage system;
    a test module communicatively coupled to the plurality of remotely-booted clients and configured to:

obtain system-specific parameters regarding at least one of the plurality of remotely-booted clients, the network storage system, and the boot management server, the system-specific parameters including an average client boot time threshold;

generate a plurality of client boot threads based on at least one or more of the system-specific parameters;

measure an actual average client boot time of the plurality of client boot threads; and determine a number of remotely-booted clients for substantially simultaneous remote booting based on at least the actual average client boot time and the average client boot time threshold.

16. A system according to claim 15, wherein the plurality of remotely-booted clients are booted from at least one boot image stored on the network storage system via Internet Small Computer System Interface (iSCSI).

17. A system according to claim 15, the test module further operable to instantiate a plurality of virtual machines, each virtual machine configured to generate a client boot thread.

18. A system according to claim 15, wherein the average client boot time threshold comprises a desired maximum average client boot time.

19. A system according to claim 15, wherein the determined number of remotely-booted clients is approximately equal to a maximum number of remotely-booted clients that may be substantially simultaneously booted with an average boot time less than the average client boot time threshold.

20. A system according to claim 15, wherein the determined number of remotely-booted clients is approximately equal to an average number of remotely-booted clients that may be substantially simultaneously booted with an average boot time less than the average client boot time threshold.

* * * * *